(No Model.)

J. FENIMORE.

HAY AND COTTON PRESS.

No. 262,656. Patented Aug. 15, 1882.

Witnesses:
E. B. Stocking
W. F. Crousman

Inventor
John Fenimore
By
Attÿ

(No Model.)

J. FENIMORE.

HAY AND COTTON PRESS.

No. 262,656. Patented Aug. 15, 1882.

UNITED STATES PATENT OFFICE.

JOHN FENIMORE, OF ORLEANS, INDIANA.

HAY AND COTTON PRESS.

SPECIFICATION forming part of Letters Patent No. 262,656, dated August 15, 1882.

Application filed July 1, 1882. (No model.)

*To all whom it may concern:*

Be it known that I, JOHN FENIMORE, a citizen of the United States of America, residing at Orleans, in the county of Orange and State of Indiana, have invented certain new and useful Improvements in Hay and Cotton Presses; and I do hereby declare the following to be a full, clear, and exact description of the invention, such as will enable others skilled in the art to which appertains to make and use the same, reference being had to the accompanying drawings, and to letters or figures of reference marked thereon, which form a part of this specification.

My invention relates to a combined hay and cotton press; and it consists in certain features hereinafter described, and specifically set forth in the claims.

Figure 1:
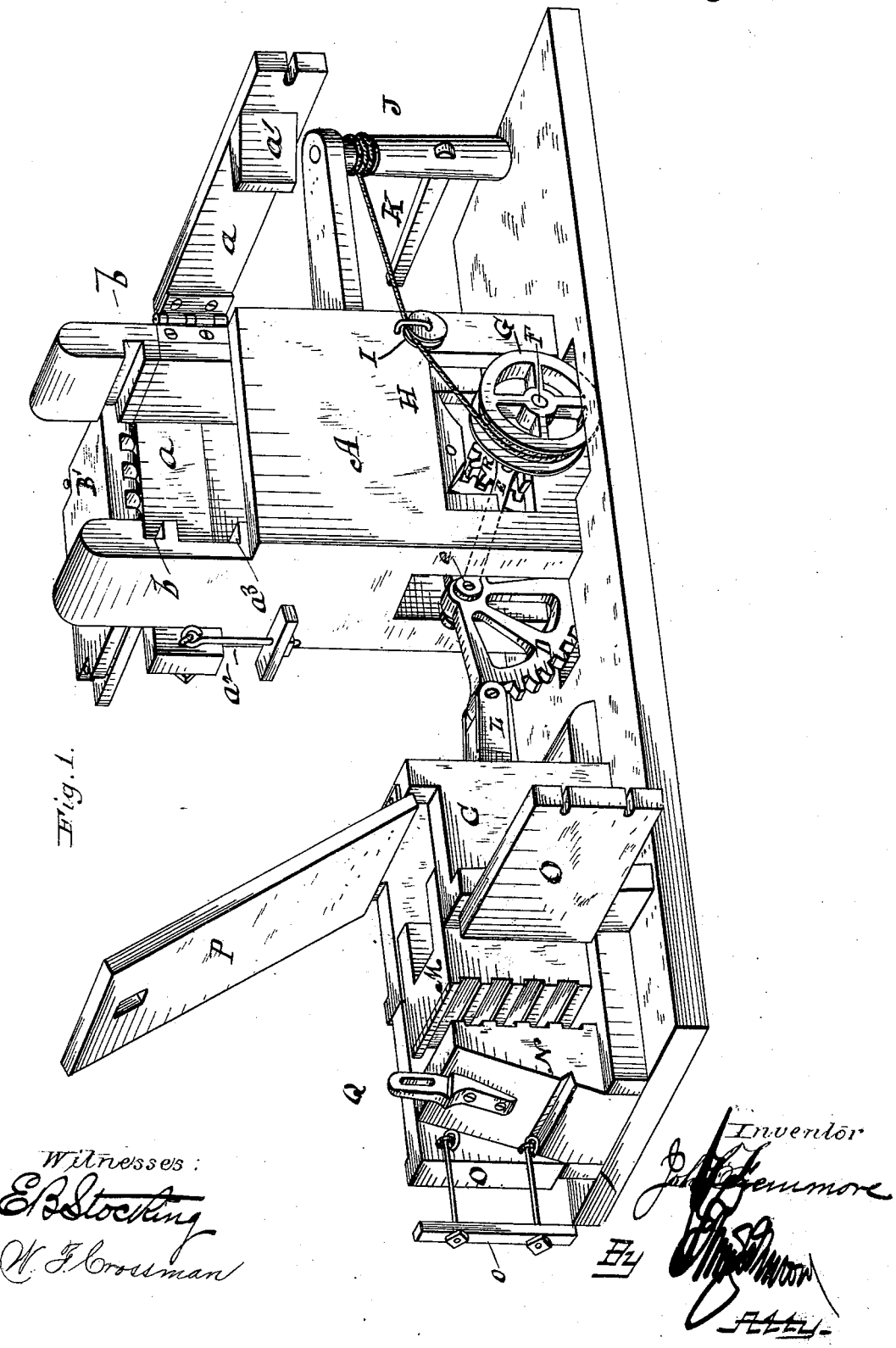
Figure 2:
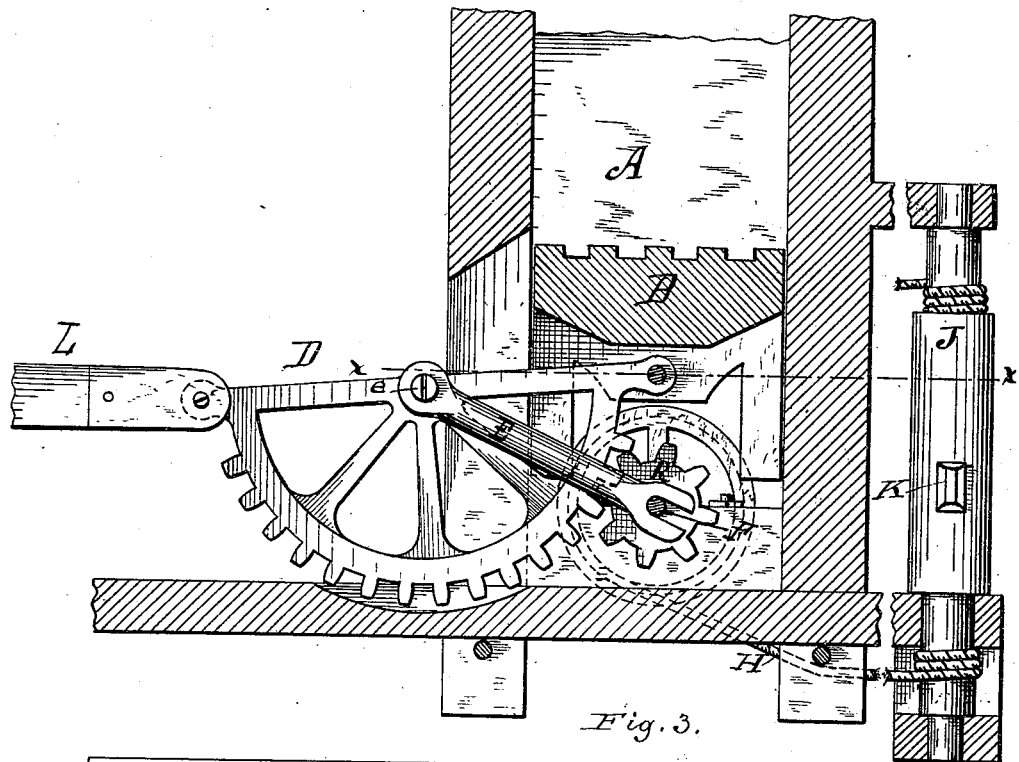
Figure 3:
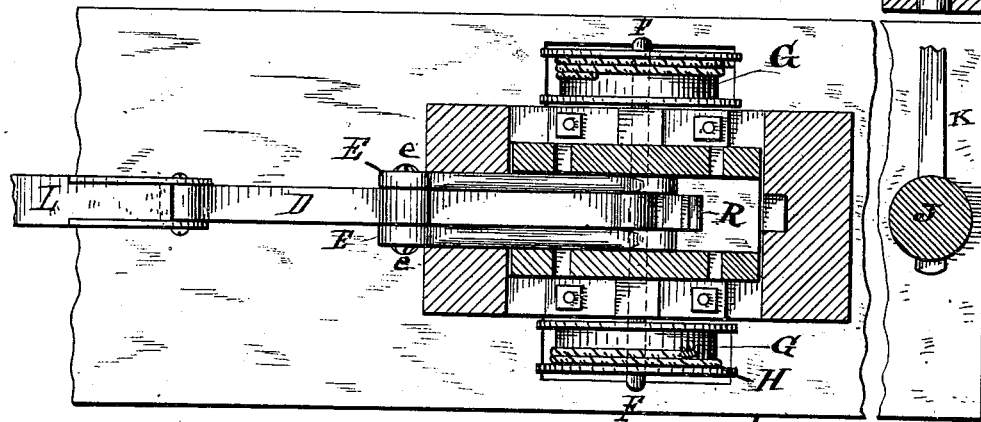

Figure 1 is a perspective of a combined press constructed in accordance with my invention. Fig. 2 is a vertical section of an upright hay or cotton press, and Fig. 3 a transverse section of the same on the line $x\ x$ of Fig. 2.

Like letters refer to like parts in all of the figures.

A represents the upright hay or cotton press, and C the horizontal hay or cotton press. At the top of the upright press is a sliding bed-plate, B', provided with the usual grooves for the insertion of bale-ties, as are all of the platens and bed-plates in the combined press. The platen B' slides in grooves $b$ formed in the uprights of the press A. Just beneath the grooves are secured the swinging doors $a$, each of which is provided with an inwardly-projecting beveled end piece, $a'$, and a fastening-bolt, $a^2$, is secured to one of the doors and serves to fasten the same in a closed position in a manner readily apparent. One of the uprights of the press is cut away at $a^3$ in such manner that it is adapted to receive the beveled projections $a'$ on the doors $a$. Within the press a platen, B, operates vertically, and to the platen is secured in a suitable manner and pivotally one extremity of the semicircular gear or geared sector D. The sector D is pivotally secured within two arms, E, one upon each side of the sector, and these arms are supported upon a shaft, F, provided at each end with a pulley, G, over and about which extend ropes H, coiled thereon in opposite directions and passing over suitably-located pulleys, I, to a standard, J, one of the ropes being coiled about the upper end of said standard and the other about the lower end thereon, and each in opposite direction. This standard is adapted by means of the beam K to be rotated in consecutive opposite directions—in this instance by horse-power, or it may be adapted to be thus operated by other motors. To the opposite end of the sector D is secured a connecting-rod, L, which operates the platen or follower M of the horizontal hay or cotton press C, provided with a bed, N, and with the doors O O, adapted to be fastened in a closed position by the bolts and bar $o$, and also provided with a cover, P, slotted for the reception of the staple Q, in which a wedge is driven after the cover is lowered, to securely hold the same in a closed position.

This being the construction of the press, the operation is as follows: Taking the press in the condition shown—that is, with the platen B of the upright hay or cotton press depressed—the rope H, passing over the guide-pulley I to the top of the post J, is tightened by turning the post or standard in a direction and manner readily apparent to produce the effect, and thereby unwind it from its pulley G, the direction of this operation being such as to rotate the shaft F and pinion R thereon in such a direction as to elevate the platen by meshing with the sector D and causing it to rotate on its pivot $e$ at the outer end of the arms E, whereby the arms are oscillated toward and are caused to stand in a substantially-upright line, one half of the sector D—that half which extends from the platen to the outer extremity of the arms E, together with said arms—constituting in effect a toggle-joint. Before this operation takes place it is of course understood that a sufficient quantity of hay or cotton has been introduced into the press through the doors $a$ to constitute a bale when compressed, and that the door has been closed and secured in a manner apparent from the construction shown and described, whereby the inner contour of the press has been restored at its upper portion to a uniform outline by the introduction of the beveled projections $a'$ into the cut-away portions $a^3$ of the upright, so that no obstruction or impediment to the operation of compressing the hay or cotton within the upper part of the press occurs. At this point in the operation, as described, we have a bale of hay or cotton compressed against the platen B' and within the space covered by the doors a.

Turning now to the horizontal hay or conton press, it will be observed that the outer half of the sector D has been drawn from a horizontal to a substantially-vertical position, and has, through the medium of the connecting-rod L, withdrawn the platen or follower M from the bed-piece N of the horizontal hay or cotton press C, so that while the bale of hay or cotton is under compression in the press A, or while it is sufficiently released from compression by a slight movement downward of the platen B, for the purpose of removing the compressed bale by opening the doors a and drawing it off from the platen, hay or cotton may, after opening the cover P, be introduced into press C in a quantity sufficient to make a compressed bale, and, the cover then being lowered and fastened, the compression of the material is produced by reversing the direction in which the standard J is operated, and, through the connecting mechanism, the direction of the rotation of the pinion R is reversed, whereby the sector, which, in the operation thus far described, is in substantially a vertical position, is brought with great power to a horizontal position, its outer half and the arms E E constituting, as before, a toggle-joint operating against the platen or follower of the horizontal press, producing the desired compression of the material therein, and while so compressed the doors O O are opened, the ties applied to the bale, the compression lessened, and the bale is removed. During this operation of the horizontal press material is being fed to the upright press for compression in a subsequent reversal of the mechanism, as heretofore described.

Thus it will be seen that the power is used intermittently, and that while one of the presses is being prepared for use the product of the other is being removed therefrom.

Having described my invention and its operation, what I claim as new, and desire to secure by Letters Patent, is—

1. The combination of two independent presses and a geared sector connected to their platen, the oscillating supports for the sector pivoted to the shaft, provided with pulleys, and means, substantially as shown and described, for operating the shaft in opposite directions, substantially as and for the purpose as set forth.

2. The combination of two independent presses, a sector connected to their platen, an oscillating support for the sector, a shaft provided with a pinion and with pulleys, ropes coiled about the pulleys in opposite directions and about a standard in opposite direction, and means for rotating the standard in opposite directions, substantially as and for the purpose as set forth.

3. The combination of the press A, one of the uprights of which is cut away, as at $a^3$, with the doors a, provided with the beveled projections $a'$ and with the sliding platen B.

4. The combination of the sector D, platen B, arms E E, pivot e, shaft F, pinion R, and means for operating the shaft in opposite directions at will, substantially as shown and described.

5. The combination of the platens B and M and connecting-rod L, the sector D, and arms E E, the pinion R, the shaft F, the pulleys G G, the ropes H H, and the standard J and the lever K, one of said ropes being wound about its pulley and the shaft in opposite direction to the other and at opposite ends of the shaft, substantially as shown and described.

In testimony whereof I affix my signature in presence of two witnesses.

JOHN FENIMORE.

Witnesses:
WILLIAM S. SPICELY,
CHARLES P. MUNGER.